(12) United States Patent
Uchida

(10) Patent No.: US 8,980,472 B2
(45) Date of Patent: Mar. 17, 2015

(54) SECONDARY BATTERY

(75) Inventor: Yozo Uchida, Toyota (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 25 days.

(21) Appl. No.: 13/812,942

(22) PCT Filed: Aug. 5, 2010

(86) PCT No.: PCT/JP2010/063334
§ 371 (c)(1),
(2), (4) Date: Jan. 29, 2013

(87) PCT Pub. No.: WO2012/017546
PCT Pub. Date: Feb. 9, 2012

(65) Prior Publication Data
US 2013/0130107 A1 May 23, 2013

(51) Int. Cl.
H01M 4/02 (2006.01)
H01M 4/62 (2006.01)
H01M 4/64 (2006.01)

(52) U.S. Cl.
CPC .............. H01M 4/626 (2013.01); H01M 4/64 (2013.01)
USPC ..................................................... 429/211

(58) Field of Classification Search
None
See application file for complete search history.

(56) References Cited

U.S. PATENT DOCUMENTS

| 2002/0015889 A1 | 2/2002 | Yamamoto et al. |
| 2010/0104944 A1 | 4/2010 | Saito et al. |
| 2010/0129718 A1* | 5/2010 | Higuchi et al. .......... 429/231.95 |
| 2011/0111288 A1 | 5/2011 | Nishida et al. |

FOREIGN PATENT DOCUMENTS

| CN | 1333576 | 1/2002 |
| CN | 101682024 | 3/2010 |
| JP | 11-144709 | 5/1999 |
| JP | 2002-164050 | 6/2002 |
| JP | 2003-157852 | 5/2003 |
| JP | 2006-286427 | 10/2006 |
| JP | 2008-097879 | 4/2008 |
| JP | 2009-211824 | 9/2009 |
| JP | 2010-73339 | 4/2010 |
| JP | 2010-86866 | 4/2010 |
| WO | WO 2008/081839 A1 | 7/2008 |
| WO | WO2009078159 * | 6/2009 |
| WO | WO 2010/064637 | 6/2010 |

* cited by examiner

*Primary Examiner* — Patrick Ryan
*Assistant Examiner* — Wyatt McConnell
(74) *Attorney, Agent, or Firm* — Finnegan, Henderson, Farabow, Garrett & Dunner, LLP

(57) ABSTRACT

The secondary battery according to the present invention includes an electrode (10) having: an electrode current collector (12), an electrode active material layer (14) formed on the surface of the electrode current collector (12), an electrically conductive film (16) that covers the surface of the electrode active material layer (14), and an electrical conductor part (18) for forming a direct electrical connection between the electrically conductive film (16) and the electrode current collector (12) by going around the electrode active material layer (14).

13 Claims, 9 Drawing Sheets

SAMPLE 1 (ELECTRICALLY CONDUCTIVE FILM)
SAMPLE 2 (ELECTRICALLY CONDUCTIVE FILM
+ INSULATING FILM)

SECONDARY BATTERY

CROSS-REFERENCE TO RELATED APPLICATIONS

This application is a national phase application of International Application No. PCT/JP2010/063334, filed Aug. 5, 2010, the content of which is incorporated herein by reference.

TECHNICAL FIELD

The present invention relates to a secondary battery having an electrode provided with an electrode current collector and an electrode active material layer formed on the surface of the electrode current collector.

BACKGROUND ART

In recent years, the importance of lithium ion batteries, nickel hydride batteries and other secondary batteries as vehicle-mounted batteries and power sources for personal computers and mobile phones has increased. In particular, much is expected of lithium secondary batteries, which are lightweight and achieve high energy density, as batteries able to be advantageously used as vehicle-mounted high output power sources. In a typical constitution of this type of secondary battery, an electrode has a constitution whereby the material capable of reversibly storing and releasing lithium ions (an electrode active material) is held by an electrically conductive member (an electrode current collector). For example, a typical example of an electrode current collector used in the positive electrode (a positive electrode current collector) is a sheet-shaped or member comprising mainly aluminum or an aluminum alloy. In addition, a typical example of an electrode active material used in a positive electrode (a positive electrode active material) is an oxide that contains lithium and one or two or more transition metal elements as constituent metal elements (a lithium-transition metal composite oxide).

In cases where a lithium-transition metal composite oxide is used as a positive electrode active material, the lithium-transition metal composite oxide has low electron conductivity, and is therefore generally used in combination with an electrically conductive material. For example, in a typical constitution of this type of positive electrode, a lithium-transition metal composite oxide, which is a positive electrode active material, is blended with a carbon powder as an electrically conductive material, and a positive electrode is formed by binding this mixture on the surface of a positive electrode current collector by means of a binder. An electrically conductive path is formed between the positive electrode active material and the positive electrode current collector due to the presence of the carbon powder, thereby enabling the transfer of electrons between the positive electrode active material and the positive electrode current collector. Prior art relating to this type of electrode is disclosed in, for example, Patent Literature 1 to 3.

CITATION LIST

Patent Literature

Patent Literature 1: Japanese Patent Application Publication No. 2003-157852

Patent Literature Japanese Patent Application Publication No. 2002-164050

Patent Literature 3: Japanese Patent Application Publication No. H11-144709

SUMMARY OF INVENTION

Here, one intended use of lithium secondary batteries is expected to be in high rate charging/discharging (high input/output) batteries. Lithium secondary batteries used as vehicle power sources (for example, lithium secondary batteries mounted in hybrid vehicles that also use other power sources having different operating principles, such as vehicles having lithium secondary batteries and an internal combustion engine as power sources) are a typical example of lithium secondary batteries intended to be used in this way. In lithium secondary batteries that require such high input/output characteristics, because it is essential to ensure a good electron conductivity from the surface part of the positive electrode active material layer to the current collector (from the top to the bottom in the thickness direction of the positive electrode active material layer), large quantities of electrically conductive materials are incorporated. However, if large quantities of electrically conductive materials are present, the mass of active material contained per unit volume of electrode is reduced, meaning that the capacity per unit volume of the electrode (and even the lithium secondary battery constituted from the electrode) is reduced. An objective of the present invention is to solve the above-mentioned problem.

The secondary battery provided by the present invention is provided with an electrode having an electrode current collector, an electrode active material layer formed on the surface of the electrode current collector, an electrically conductive film that covers the surface of the electrode active material layer, and an electrical conductor part for forming a direct electrical connection between the electrically conductive film and the electrode current collector by going around the electrode active material layer (that is, via a separate member that is different from the electrode active material layer, not via an electrically conductive path in the electrically conductive material in the electrode active material layer).

According to the constitution of the present invention, the electrode has an electrically conductive film that covers the surface of the electrode active material layer and an electrical conductor part for forming a direct electrical connection between the electrically conductive film and the electrode current collector by going around the electrode active material layer, and therefore enables current collection from the surface part of the electrode active material layer via the electrically conductive film and the electrical conductor part. Therefore, the current collection efficiency of the electrode (the ease with which electrons are transferred between the electrode active material and the electrode current collector) is improved, and it is possible to improve the performance (for example, the high rate charging/discharging characteristics) of a lithium secondary battery constituted from the electrode.

In a preferred aspect of the secondary battery disclosed here, the electrically conductive film is a porous film having pores. By making the electrically conductive film a porous film, an electrolyte liquid can pass into the electrically conductive film. Therefore, even in cases where an electrically conductive film is formed on the surface of an electrode active material layer, an electrolyte liquid can adequately penetrate into the electrode active material layer.

In a preferred aspect of the secondary battery disclosed here, the thickness of the electrically conductive film is approximately 100 nm to 3000 nm. If the thickness of the electrically conductive film is too high, the electrode active material layer is excessively covered and ions are blocked, meaning that the energy density of the secondary battery tends to decrease and the strength of the electrically conductive film may be insufficient. Meanwhile, if the thickness of the electrically conductive film is too low, resistance in the surface direction (horizontal direction) of the electrically conductive film increases, meaning that it is not possible to achieve the above-mentioned electrode current collection efficiency improvement effect. Therefore, the thickness of the electrically conductive film is suitably 100 nm to 3000 nm, preferably 100 nm to 2000 nm, more preferably 100 nm to 1000 nm, and most preferably 100 nm to 500 nm. If the thickness of the electrically conductive film falls within such a range, it is possible to obtain an electrically conductive film that achieves both high mechanical strength and excellent electrical conductivity.

In a preferred aspect of the secondary battery disclosed here, the electrically conductive film is constituted from at least one of a metal carbide, a metal nitride and a valve metal that are electrically conductive. The electrically conductive metal carbide can be, for example, a carbide of at least one metal selected from the group consisting of W, Zr, Ti, Nb, Ta, Cr and Mo. In addition, the electrically conductive metal nitride can be, for example, a nitride of at least one metal selected from the group consisting of Ti, Zr and Nb. In addition, the electrical valve metal can be at least one valve metal selected from the group consisting of Hf, Al and Zr. These materials are preferred due to having high electrical conductivity and being electrochemically stable within the scope of use of a battery.

In a preferred aspect of the secondary battery disclosed here, the electrical conductor part is formed so as to cover the edge (side surface) of the electrode active material layer and be in contact with the surface of the electrode current collector. In addition, it is preferable for the electrical conductor part to be constituted from the same material as the electrically conductive film and integrally formed with the electrically conductive film. In this case, it is easy to form the electrically conductive film and the electrical conductor part by using the same film formation process.

In a preferred aspect of the secondary battery disclosed here, the electrode has an insulating film that covers the surface of the electrically conductive film. By covering the surface of the electrode active material layer with the electrically conductive film, the current collection efficiency of the battery is improved, but current can suddenly flow between the positive electrode and negative electrode if a short circuit occurs, and problems such as heat generation can occur in this case. By using the above-mentioned constitution, the surface of the electrically conductive film is covered by the insulating film, meaning that it is possible to avoid an electrical connection between the positive electrode and the negative electrode due to the presence of the insulating film, and it is possible to solve problems such as the above-mentioned heat generation.

In a preferred aspect of the secondary battery disclosed here, the insulating film is a porous film having pores. By making the insulating film a porous film, an electrolyte liquid can pass into the insulating film. Therefore, even in cases where an insulating film is formed on the surface of the electrically conductive film, an electrolyte liquid can adequately penetrate into the electrode active material layer.

In a preferred aspect of the secondary battery disclosed here, the thickness of the insulating film is approximately 10 nm to 100 nm. If the thickness of the insulating film is too high, the electrode active material layer is excessively covered. and ions are blocked, meaning that the energy density of the secondary battery tends to decrease and the strength of the insulating film may be insufficient. Meanwhile, if the thickness of the insulating film is too low, it is not possible to avoid an electrical connection between the positive electrode and the negative electrode. Therefore, the thickness of the insulating film is suitably 10 nm to 100 nm, preferably 20 nm to 90 nm, more preferably 30 nm to 80 nm, and most preferably 40 nm to 70 nm. If the thickness of the insulating film falls within such a range, it is possible to obtain an insulating film that achieves both high mechanical strength and an excellent short circuit prevention effect.

In a preferred aspect of the secondary battery disclosed here, the insulating film is constituted from at least one of a metal oxide, a metal nitride and a carbonaceous material that have insulating properties. The insulating metal oxide can be, for example, an oxide of at least one metal, selected from the group consisting of Al, Mg, Zr and Ti. In addition, the insulating metal nitride can be, for example, a nitride of at least one metal selected from the group consisting of Si, Cr, B and Al. In addition, the insulating carbonaceous material can be, for example, diamond-like carbon. These materials are preferred due to having high electrical resistance and being electrochemically stable within the scope of use of a battery.

In a preferred aspect of the secondary battery disclosed here, the insulating film is constituted from an insulating electrode active material. In this case, the electrode active material that constitutes the insulating film contributes to charging and discharging, and therefore enables an increase in energy density of a secondary battery constituted from this electrode. The insulating electrode active material can be, for example, an olivine type lithium phosphate compound such as lithium iron phosphate ($LiFePO_4$), lithium manganese phosphate ($LiMnPO_4$) or lithium nickel phosphate ($LiNiPO_4$).

In addition, a method for advantageously producing an electrode used in the above-mentioned secondary battery is provided by the present invention. This method includes disposing, in a chamber, an electrode structure which is constituted from an electrode current collector and an electrode active material layer formed on a surface of the electrode current collector, reducing the pressure inside the chamber, and forming an electrically conductive film on a surface of the electrode active material layer of the electrode structure disposed in the reduced pressure atmosphere, and forming an insulating film on a surface of the formed electrically conductive film. In this way, an electrode having such current collection efficiency can be advantageously produced.

In a preferred aspect of the electrode production method disclosed here, the formation of the electrically conductive film and the formation of the insulating film are carried out in the same chamber in which the reduced pressure atmosphere is formed. By carrying out the formation of the electrically conductive film and the formation of the insulating film in the same chamber in which the reduced pressure atmosphere is formed, it is possible to suppress the formation of a substance such as an unwanted oxide film on the electrically conductive film. Therefore, it is possible to produce a high quality electrode. It is preferable for the electrode structure to be an elongated electrode structure sheet, and for the formation of the electrically conductive film and the formation of the insulating film to be carried out continuously in a longitudinal direction of the elongated electrode structure sheet. In this case, it is possible to produce the above-mentioned electrode with good efficiency.

Any of the secondary batteries disclosed here exhibits performance suitable for a vehicle-mounted battery and exhibits particularly excellent high rate charge/discharge (input/output) characteristics. Therefore, a vehicle mounted with any of the secondary batteries disclosed here is provided by the present invention. In particular, a vehicle (for example, an automobile) having the secondary battery as a power source (typically, a power source for a hybrid vehicle or electric vehicle) is provided.

DESCRIPTION OF EMBODIMENTS

Figure 1:
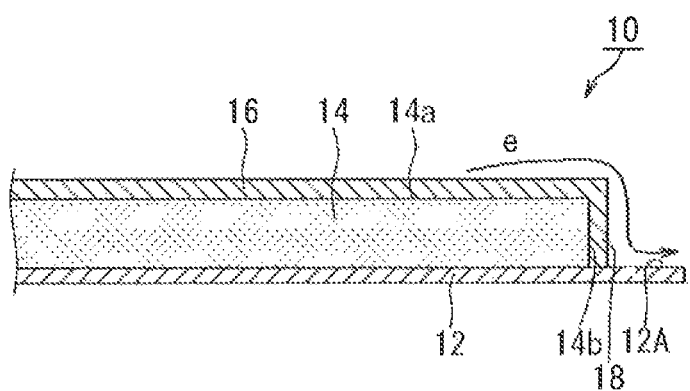
FIG. 1 is a cross-sectional view showing a schematic representation of a positive electrode sheet according to one embodiment of the present invention.

Embodiments of the present invention will now be explained with reference to the drawings. In the drawings below, members/parts that carry out the same action are given the same symbols. Moreover, the dimensional relationships (length, width, thickness and so on) in the drawings do not reflect actual dimensional relationships. In addition, matters other than those explicitly mentioned in the present specification but which are essential for carrying out the invention (for example, ordinary features relating to a method for producing an electrode active material, the constitution or production method of a separator or electrolyte, the constitution of a secondary battery or other type of battery and so on) are design matters that a person skilled in the art could understand on the basis of the prior art in this technical field.

Although not particularly limiting the invention, secondary batteries according to these embodiments are explained using mainly lithium secondary batteries (typically lithium ion batteries) as examples.

<First Embodiment>

With reference to FIG. 1, a positive electrode 10 provided in a lithium secondary battery according to the present embodiment will now be explained.

The positive electrode (positive electrode sheet) 10 provided in the lithium secondary battery disclosed here has a positive electrode current collector 12 and a positive electrode active material layer 14, which is formed on the surface of the positive electrode current collector 12. In addition, the positive electrode sheet 10 has an electrically conductive film 16, which covers the surface of the positive electrode active material layer 14, and an electrical conductor part 18 for forming a direct electrical connection between the electrically conductive film 16 and the electrode current collector 12 by going around the electrode active material layer 14.

In this embodiment, the positive electrode sheet 10 has a structure whereby the positive electrode active material layer 14 that contains a positive electrode active material is held on the surface of the elongated sheet-shaped foil-like positive electrode current collector 12. However, the positive electrode active material layer 14 is not attached to one side edge along the edge, in the width direction, of the positive electrode sheet 10 (the side edge part on the right-hand side in the diagram), and a positive electrode active material layer-non-forming part 12A, which exposes a certain width of the positive electrode current collector 12, is formed.

Apart from the electrically conductive film 16 and the electrical conductor part 18 being formed, the constituent elements that constitute this positive electrode sheet 10 are not particularly limited and may be similar to those of positive electrode sheets in conventional lithium secondary batteries. An aluminum foil or other metal foil suitable for use in a positive electrode can be advantageously used in the positive electrode current collector 12.

The positive electrode active material is not particularly limited, and can be one or two or more types of material previously used in lithium secondary batteries. Preferred examples thereof include positive electrode active materials mainly comprising oxides containing lithium and a transition metal element as constituent metal elements, such as lithium nickel oxide ($LiNiO_2$), lithium cobalt oxide ($LiCoO_2$), or lithium manganese oxide ($LiMn_2O_4$) (lithium-transition metal oxides).

This type of lithium-transition metal oxide (typically in particulate form) can be a lithium-transition metal oxide powder prepared using a conventional publicly known method. For example, a lithium-transition metal oxide powder constituted essentially from secondary particles having an average particle diameter of approximately 1 μm to 25 μm can be advantageously used as the positive electrode active material.

The above-mentioned positive electrode active material layer can, if necessary, contain one or two or more types of material able to be used as constituent components of a positive electrode active material layer in an ordinary lithium secondary battery. Examples of such materials include electrically conductive materials and binders. Carbon materials such as carbon powders or carbon fibers can be advantageously used as the electrically conductive materials. Alternatively, electrically conductive metal powders such as nickel powders may also be used. Examples of the binders include a variety of polymeric materials able to function as binders for the above-mentioned constituent materials (for example, polyvinylidene fluoride and the like).

The above-mentioned positive electrode active material layer can be formed by mixing a positive electrode active material powder with. the above-mentioned electrically conductive material and then binding this mixture on the surface of the positive electrode current collector by means of the above-mentioned binder. An electrically conductive path is formed between the positive electrode active material and the positive electrode current collector due to the presence of the electrically conductive material, thereby effecting the transfer of electrons between the positive electrode active material and the positive electrode current collector via this electrically conductive path.

In addition, the positive electrode sheet 10 has an electrically conductive film 16, which covers the surface 14a of the positive electrode active material layer 14, and an electrical conductor part 18 for forming a direct electrical connection between the electrically conductive film 16 and the electrode current collector 12 by going around the electrode active material layer 14. The electrical conductor part 18 forms a direct electrical connection between the electrically conductive film 16 and the electrode current collector 12 by means of a separate member that is different from the electrode active material layer, not via an electrically conductive path in the electrically conductive material in the electrode active material layer. In this embodiment, the electrical conductor part 1 is formed so as to cover the edge part (side surface) 14b of the positive electrode active material layer 14 and be in contact with the surface of the positive electrode current collector 12. In addition, in this embodiment, the electrical conductor part 18 is formed from the same material as the electrically conductive film 16 and is integrally formed with the electrically conductive film 16 by means of the same film-forming process.

In this way, by having an electrically conductive film 16, which covers the surface 14a of the positive electrode active material layer 14, and an electrical conductor part 18 for forming a direct electrical connection between the electrically conductive film 16 and the electrode current collector 12 by going around the electrode active material layer 14, it is possible to collect current from the surface layer part of the positive electrode active material layer. That is, direct electron transfer (not via an electrically conductive path achieved by an electrically conductive material) can be achieved between the positive electrode active material contained in the surface part and the positive electrode current collector via the electrically conductive film 16 and the electrical conductor part 18. Therefore, the current collection efficiency of the positive electrode (the ease with which electrons are transferred between the positive electrode active material and the positive electrode current collector) is improved, and it is possible to improve the performance (for example, the high rate charging/discharging characteristics) of a lithium secondary battery constituted from the positive electrode.

Examples of materials able to be used in the above-mentioned electrically conductive film include electrically conductive metal carbides, metal nitrides and valve metals. Preferred examples of electrically conductive metal carbides include tungsten carbide (WC), zirconium carbide (ZrC), titanium carbide (TiC), niobium carbide (NbC), chromium carbide ($Cr_3C_2$) and molybdenum carbide (MOC). Preferred examples of electrically conductive metal nitrides include titanium nitride (TiN), zirconium nitride (ZrN) and niobium nitride (NbN). Preferred examples of electrically conductive valve metals include hafnium (HP), zirconium (Zr) and aluminum (Al). One or two or more types of these materials may be used.

The above-mentioned materials exhibit high electrical conductivity and therefore form an electrically conductive film comprising the material on the surface of the positive electrode active material layer, thereby enabling current collection from the surface part of the positive electrode active material layer and enabling an improvement in current collection efficiency. Resistance values for the electrically conductive film are approximately 17 $\mu\Omega\cdot m$ for tungsten carbide (WC), approximately 42 $\mu\Omega\cdot m$ for zirconium carbide (ZrC), approximately 52 $\mu\Omega\cdot m$ for titanium carbide (TiC), approximately 19 $\mu\Omega\cdot m$ for niobium carbide (NbC), approximately 75 $\mu\Omega\cdot m$ for chromium carbide ($Cr_3C_2$) and approximately 57 $\mu\Omega\cdot m$ for molybdenum carbide (MoC). In addition, resistance values are approximately 25 $\mu\Omega\cdot m$ for titanium nitride (TiN), approximately 21 $\mu\Omega\cdot m$ for zirconium nitride (ZrN) and approximately 58 $\mu\Omega\cdot m$ for niobium nitride (NbN). In addition, resistance values are approximately 40 $\mu\Omega\cdot m$ for hafnium (Hf), approximately 40 $\mu\Omega\cdot m$ for zirconium (Zr) and approximately 2.66 $\mu\Omega\cdot m$ for aluminum (Al).

In addition, the above-mentioned materials have standard oxidation-reduction potentials that are higher than the positive electrode potential and have a stable coating film formed on the surface, and are therefore electrochemically stable even when an electrically conductive film comprising the materials is formed on the surface of the positive electrode active material layer. For example, even when used at an oxidation-reduction potential of approximately 1.2 V (vs $H/H^+$), the above-mentioned materials are not oxidatively decomposed.

As a method for forming this type of electrically conductive film on the surface of the positive electrode active material layer, a publicly known film formation method, for example a physical vapor deposition method (a PVD method such as sputtering method) or chemical vapor deposition method (a CVD method such as a plasma CVD method) can be advantageously used. Formation of the electrically conductive film using this type of film formation method (vapor deposition of the electrically conductive film) is typically carried out under reduced pressure conditions (for example, in an inert gas atmosphere, a mixed gas atmosphere of an inert gas and a non-oxidizing gas or an ambient atmosphere at a pressure of approximately 0.001 Pa to 100 Pa). As a method for forming the electrically conductive film on the surface of the positive electrode active material layer in the technique disclosed here, a sputtering method that uses the substance of the electrically conductive film as a target can be advantageously used.

Here, when forming the above-mentioned electrically conductive film in the present embodiment, a film of an electrically conductive material is formed so as to cover the surface and edge (side surface) 14b of the positive electrode active material layer 14 and he in contact with the surface of the positive electrode current collector 12 (positive electrode active material layer-non-forming part 12A). Due to a film of an electrically conductive material being formed so as to cover the surface and edge (side surface) 14b of the positive electrode active material layer 14 and be in contact with the surface of the positive electrode current collector 12 in this way, it is possible to simultaneously form the electrical conductor part 18 that forms an electrical connection between the electrically conductive film 16 and the positive electrode current collector 12 by going around the positive electrode active material layer 14. In this ease, it is easy to form the electrically conductive film 16 and the electrical conductor part 18 using the same film formation process.

The thickness of the above-mentioned electrically conductive film is not particularly limited as long as the film can uniformly cover the above-mentioned positive electrode active material layer, but is approximately 100 nm to 3000 nm. If the thickness of the electrically conductive film is too high, the positive electrode active material layer is excessively covered and lithium ions are blocked, meaning that the energy density of a lithium secondary battery constituted using this electrode tends to decrease and the strength of the electrically conductive film may be insufficient. Meanwhile, if the thickness of the electrically conductive film is too low, resistance in the surface direction (horizontal direction) of the electrically conductive film increases, meaning that it is not possible to achieve the above-mentioned electrode current collection efficiency improvement effect. Therefore, the thickness of the electrically conductive film is suitably 100 nm to 3000 nm, preferably 100 nm to 2000 nm, more preferably 100 nm to 1000 nm, and most preferably 100 nm to 500 nm. If the thickness of the electrically conductive film falls within such a range, it is possible to obtain an electrically conductive film that achieves both high mechanical strength and excellent electrical conductivity. Moreover, the thickness of the electrically conductive film can be arbitrarily controlled by adjusting the conditions used when forming the electrically conductive film (for example, the sputtering conditions).

Within the surface of the above-mentioned positive electrode active material layer, the range (region) on which the above-mentioned electrically conductive film is formed may be a. part or all of the surface of the positive electrode active material layer, but it is preferable for the electrically conductive film to be formed on the whole of the surface of the positive electrode active material layer. By forming the electrically conductive film on the whole of the surface of the positive electrode active material layer, it is possible to reliably achieve an electrode current collection efficiency improvement effect such as that described above.

In addition, in the preferred technique disclosed here, the above-mentioned electrically conductive film is a porous film having pores. By making the electrically conductive film a porous film, an electrolyte liquid and ions can pass into the electrically conductive film. Therefore, even in cases where an electrically conductive film is formed on the surface of an electrode active material layer, an electrolyte liquid and ions can adequately penetrate into the positive electrode active material layer. A porous electrically conductive film can he achieved by adjusting the conditions used when foraying the electrically conductive film. For example, by variously altering the sputtering conditions, it is possible to alter the fineness or coarseness of the internal structure of the formed electrically conductive film. The porosity of the electrically conductive film is not particularly limited, but is approximately 5% to 40%, and preferably 20% to 30%. If the porosity of the electrically conductive film falls within such a range, it is possible to obtain an electrically conductive film that achieves both high electrolyte liquid permeability and high mechanical strength. Moreover, even in cases where the above-mentioned pores are not formed in the electrically conductive film (that is, in cases where the electrically conductive film is densely formed), it is possible to ensure sufficient ion permeability by means of protrusions and recesses on the surface of the electrode active material layer.

According to the constitution of the present embodiment, it is possible to collect current from the surface part of the positive electrode active material layer also, and it is therefore possible to obtain an electrode having good performance even if a small quantity of an electrically conductive material is used. For example, the proportion of an electrically conductive material in the overall positive electrode active material layer can be approximately 4 mass % to 8 mass %, and is preferably approximately 5 mass % to 6 mass %. If the electrically conductive material content falls within such a range, it is possible to constitute a lithium secondary battery having excellent high rate charging/discharging characteristics.

Moreover, although not particularly limited, the proportion of the positive electrode active material in the overall positive electrode active material layer is preferably approximately 50 mass % or higher (typically 50 mass % to 95 mass %), and more preferably approximately 75 mass % to 90 mass %. In addition, in cases where the electrode contains positive electrode active material layer-forming components other than the positive electrode active material and the electrically conductive material (for example, a binder),the total content of these optional components is preferably approximately 7 mass % or lower, and more preferably approximately 5 mass % or lower (for example, approximately 1 mass % to 5 mass %).

<Second Embodiment>

Figure 2:
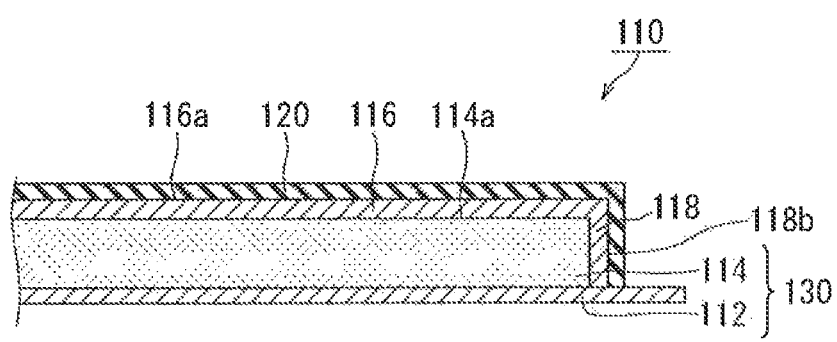
FIG. 2 is a cross-sectional view showing a schematic representation of a positive electrode sheet according to one embodiment of the present invention.

Next, with reference to FIG. 2, another embodiment of the present invention will be explained. In this embodiment, the positive electrode (a. positive electrode sheet) 110 differs from that in the above-mentioned first embodiment by having an insulating film 120, as shown in FIG. 2. That is, the positive electrode sheet 110 has an electrically conductive film 116, which covers the surface 114a of a positive electrode active material layer 114, an electrical conductor part 118 for forming a direct electrical connection between the electrically conductive film 116 and a positive electrode current collector 112 by going around the positive electrode active material layer 114, and an insulating film 120, which covers the surface 116a of the electrically conductive film 116. In this embodiment, the insulating film 120 is formed so as to cover a region that includes the surface 116a of the electrically conductive film 116 and a side surface 118b of the electrical conductor part 115.

By covering the surface of the positive electrode active material layer 114 with the electrically conductive film 116, the current collection efficiency of the positive electrode is improved, but current can suddenly flow between the positive electrode and negative electrode if a short circuit occurs, and problems such as heat generation can occur. However, according to the constitution shown in FIG. 2, the surface of the electrically conductive film 116 is covered by the insulating film 120, meaning that it is possible to prevent electrical contacts between the positive electrode (and especially the electrically conductive film) and the negative electrode due to the presence of the insulating film 120, and also possible to solve problems such as the above-mentioned heat generation.

The material used in the insulating film is preferably one which has insulating properties and which is electrochemically stable within the scope of use of a battery. This type of material can be, for example, an insulating metal oxide, metal nitride or carbonaceous material. Preferred examples of insulating metal oxides include alumina ($Al_2O_3$), magnesia (MgO) and titania ($TiO_2$). In addition, preferred examples of insulating metal nitrides include silicon nitride ($Si_3N_4$), chromium nitride (CrN), boron nitride (BN) and aluminum nitride (AlN). In addition, a preferred example of an insulating carbonaceous material is diamond-like carbon. One or two or more types of these materials may be used.

Because the above-mentioned materials have high resistance values, by forming an insulating film comprising the materials on the surface of the electrically conductive film, it is possible to advantageously avoid electrical contact between the positive electrode and the negative electrode. Resistance values for the insulating film are approximately $10^{20}$ $\Omega \cdot m$ for alumina ($Al_2O_3$), approximately $10^{12}$ $\mu\Omega \cdot m$ for magnesia (MgO), approximately $10^{18}$ $\mu\Omega \cdot m$ for silicon nitride ($Si_3N_4$), approximately 640 $\mu\Omega \cdot m$ for chromium nitride (CrN), approximately $10^4$ $\mu\Omega \cdot m$ for boron nitride (BN), approximately $10^{15}$ $\mu\Omega \cdot m$ for aluminum nitride (AlN)

and approximately $10^{18}$ μΩ·m for diamond-like carbon (DLC). In addition, the above-mentioned materials have standard oxidation-reduction potentials that are higher than the positive electrode potential, and are therefore electrochemically stable even when an insulating film comprising the materials is formed on the surface of the electrically conductive film. For example, even when used at an oxidation-reduction potential of approximately 1.2 V (vs $H/H^+$), the above-mentioned materials are not oxidatively decomposed.

Moreover, diamond-like-carbon is an amorphous inorganic carbonaceous material, and is not particularly limited within the meaning of the technical term that is commonly used in this technical field. That is, it is well-known that diamond-like carbon is an amorphous hard carbonaceous film in which diamond bonds (SP3 bonds) comprising hydrocarbons or allotropes of carbon and graphite bonds (SP2 bonds) are both present, and the ratio of diamond bonds to graphite bonds and the hydrogen content are not particularly limited. A coating film comprising insulating diamond-like carbon can be easily formed using, for example, a chemical vapor deposition method (a CVD method such as a plasma CVD method).

The insulating film formed on the surface of the above-mentioned electrically conductive film may be constituted from an insulating electrode active material (typically a material that can store and release lithium). In this ease, the electrode active material that constitutes the insulating film contributes to charging and discharging, and therefore enables an increase in energy density of a secondary battery constituted from this electrode. Preferred examples of the insulating positive electrode active material include olivine type lithium phosphate compounds such as lithium iron phosphate ($LiFePO_4$), lithium manganese phosphate ($LiMnPO_4$) or lithium nickel phosphate ($LiNiPO_4$). Because olivine type lithium phosphate compounds exhibit low electron conductivity, it is possible to form an insulating film comprising the positive electrode active materials on the surface of the electrically conductive film.

As a method for forming this type of insulating film on the surface of the electrically conductive film, a publicly known film formation method, for example a physical vapor deposition method (a PVD method such as sputtering method) or chemical vapor deposition method (a CVD method such as a plasma CVD method) can be advantageously used. Formation of the insulating film using this type of film formation method (vapor deposition of the insulating film) is typically carried out wider reduced pressure conditions (for example, in an inert gas atmosphere, a mixed. gas atmosphere of an inert gas and a non-oxidizing gas or an ambient atmosphere at a pressure of approximately 0.001 Pa to 100 Pa). As a method for forming the insulating film on the surface of the electrically conductive film in the technique disclosed here, a vacuum deposition method that uses the substance of the insulating film as a deposition material can be advantageously used.

The thickness of the above-mentioned insulating film is not particularly limited as long as the film can uniformly cover the above-mentioned electrically conductive film, but is approximately 10 nm to 100 nm. If the thickness of the insulating film is too high, the positive electrode active material layer is excessively covered and lithium ions are blocked, meaning that the energy density of a lithium secondary battery constituted using this electrode tends to decrease and the strength of the insulating film may be insufficient. Meanwhile, if the thickness of the insulating film is too low, it is not possible to avoid an electrical connection between the positive electrode and the negative electrode. Therefore, the thickness of the insulating film is suitably 10 nm to 100 nm, preferably 20 nm to 90 nm, more preferably 30 nm to 80 nm, and most preferably 40 nm to 70 nm. if the thickness of the insulating film falls within such a range, it is possible to obtain an insulating film that achieves both high mechanical strength and an excellent short circuit prevention effect. Moreover, the thickness of the insulating film can be arbitrarily controlled by adjusting the conditions when forming the insulating film (for example, the vapor deposition conditions).

Within the surface of the above-mentioned electrically conductive film, the range (region) on which the above-mentioned insulating film is formed may be a part or all of the surface of the electrically conductive film, but it is preferable for the insulating film to be formed on the whole of the surface of the electrically conductive film By forming the insulating film on the whole of the surface of the electrically conductive film, it is possible to reliably avoid electrical contact between the positive electrode and the negative electrode.

In addition, in the preferred technique disclosed here, the above-mentioned insulating film is a porous film having pores. By making the insulating film a porous film, an electrolyte .liquid and ions can pass into the insulating film. Therefore, even in cases where an insulating film is formed on the surface of an electrically conductive film, an electrolyte liquid and ions can adequately penetrate into the positive electrode active material layer. A porous insulating film can be achieved by adjusting the conditions when forming the insulating film. For example, by variously altering vapor deposition conditions, it is possible to alter the fineness or coarseness of the internal structure of the formed insulating film. The porosity of the insulating film is not particularly limited, but is approximately 5% to 40%, and preferably 20% to 30%. If the porosity of the insulating film falls within such a range, it is possible to obtain an insulating film that achieves both high electrolyte liquid permeability and high mechanical strength. Moreover, even in cases where the above-mentioned pores are not formed in the insulating film (that is, in cases where the insulating film is densely formed), it is possible to ensure sufficient ion permeability by means of protrusions and recesses on the surface of the electrode active material layer.

Figure 3:
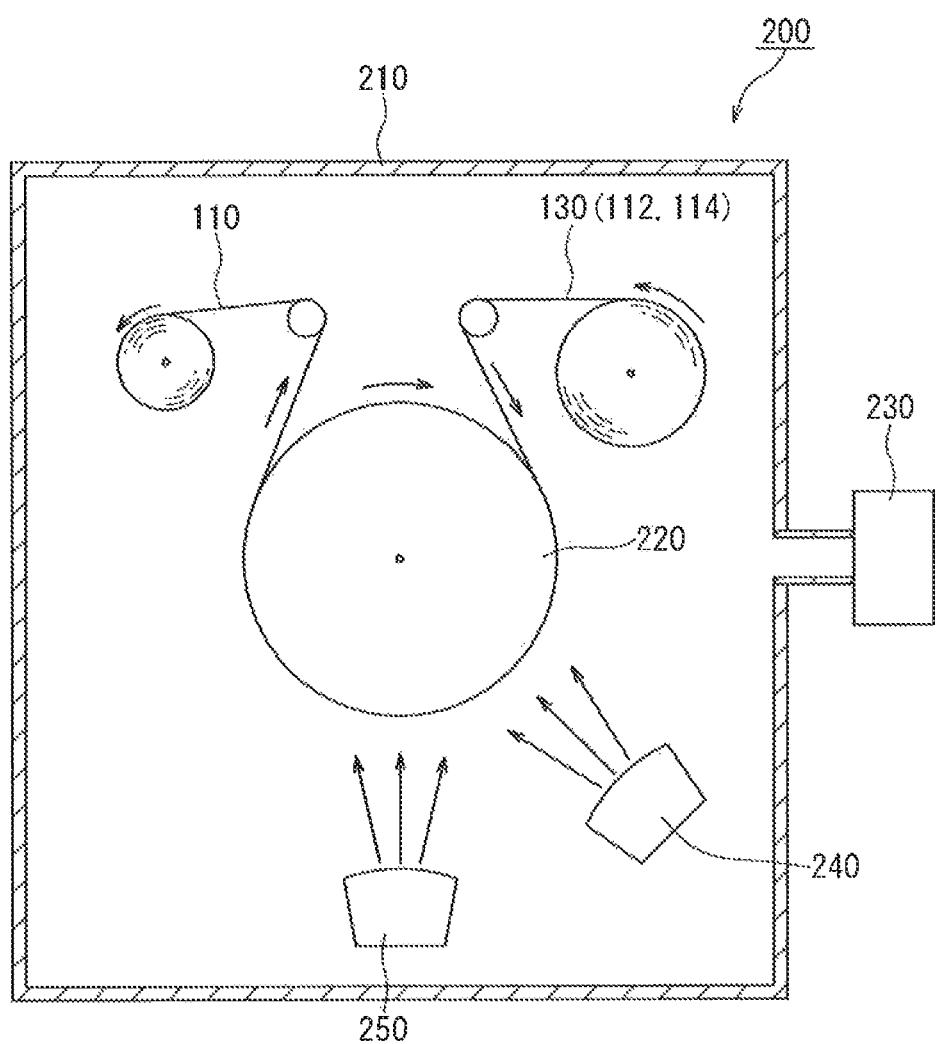
FIG. 3 is a diagram showing a schematic representation of a positive electrode sheet production apparatus according to one embodiment of the present invention.

Next, with reference to FIG. 3, an explanation will be given of an electrode production apparatus 200 that produces the positive electrode sheet 110 according to the present embodiment. As shown in FIG. 3, the electrode production apparatus 200 of the present embodiment is provided with a chamber 210, inside which the pressure can be reduced, a sheet holding part 220, Which is disposed inside the above-mentioned chamber 210, and a pressure adjusting part 230, which adjusts the pressure (internal pressure) inside the above-mentioned chamber 210. In addition, the inner part of the chamber 210 is provided with an electrically conductive film formation processing part 240 and an insulating film formation processing part 250 in that order in the sheet transport direction.

The chamber 210 is a treatment chamber for producing the above-mentioned positive electrode sheet 110, and is constituted in such a way that the pressure inside the chamber can be reduced. The sheet holding part 220 is disposed inside the chamber 210, and holds an electrode structure sheet 130 inside the chamber 210. Here, the electrode structure sheet 130 is an electrode structure at a stage prior to the electrically conductive film and insulating film being formed, and is constituted from the foil-like elongated positive electrode current collector 112 and the positive electrode active material layer 114, which is formed on the surface of the positive electrode current collector 112. The sheet holding part 220 is constituted so as to continuously distribute the elongated electrode structure sheet 130 in the longitudinal direction to the insulating film formation processing part 250 via the electrically conductive film formation processing part 240.

The pressure adjusting part 230 is attached to the outer surface of the chamber 210 and adjusts the pressure (internal pressure) inside the chamber 210. In this embodiment, the pressure adjusting part 230 reduces the pressure inside the chamber 210 and can form a prescribed reduced pressure atmosphere (for example, an inert gas atmosphere having a pressure of approximately 0.001 Pa to 100 Pa) in the chamber 210.

The electrically conductive film formation processing part 240 forms the electrically conductive film 116 on the surface of the positive electrode active material layer 114, on which is formed the electrode structure sheet 130 that has been transported by means of the above-mentioned sheet holding part 220. In this embodiment, the electrically conductive film formation processing part 240 is constituted so as to be able to form the electrically conductive film 116 comprising tungsten carbide (WC) on the surface of the positive electrode active material layer provided with the above-mentioned electrode structure sheet by a sputtering method that uses a target comprising tungsten carbide (WC).

The insulating film formation processing part 250 forms the insulating film 120 on the surface of the electrically conductive film 116 formed in the above-mentioned electrically conductive film formation processing part 240. In this embodiment, the insulating film formation processing part 250 is constituted so as to be able to form the insulating film 120, which comprises alumina ($Al_2O_3$), on the surface of the above-mentioned electrically conductive film by a vacuum deposition method that uses a deposition material comprising alumina.

When forming the electrically conductive film and insulating film using the above-mentioned apparatus, the electrode structure sheet 130, which comprises the positive electrode current collector 112 and the positive electrode active material layer 114 formed on the surface of the positive electrode current collector 112, is first disposed inside the chamber 210. Next, the pressure inside the chamber 210 is reduced, and the electrically conductive film 116 is formed on the surface of the positive electrode active material layer 114 of the electrode structure sheet 130 disposed in the reduced pressure atmosphere by the electrically conductive film formation processing part 240. Next, the insulating film 120 is formed on the surface of the above-mentioned formed electrically conductive film 116 by means of the insulating film formation processing part 250. In this embodiment, the formation of the electrically conductive film 116 and the formation of the insulating film 120 are carried out n the same chamber 210 in which the above-mentioned reduced pressure atmosphere is formed. In addition, in this embodiment, the electrode structure 130 is an elongated electrode structure sheet, and the formation of the electrically conductive film 116 and the formation of the insulating film 120 are carried out continuously in the longitudinal direction of the elongated electrode structure sheet 130.

According to the production method of the present embodiment, the formation of the electrically conductive film and the formation of the insulating film are carried out continuously in a longitudinal direction of the elongated electrode structure sheet, and it is therefore possible to produce the positive electrode sheet 110 comprising the electrically conductive film 116 and the insulating film 120 with good efficiency. In addition, because the formation of the electrically conductive film 116 and the formation of the insulating film 120 are carried out in the same chamber 210 in which the above-mentioned reduced pressure atmosphere is formed, it is possible to suppress the formation of a substance such as an unwanted oxide film on the electrically conductive film 116. Therefore, it is possible to produce a high-quality positive electrode sheet 110.

Figure 4:
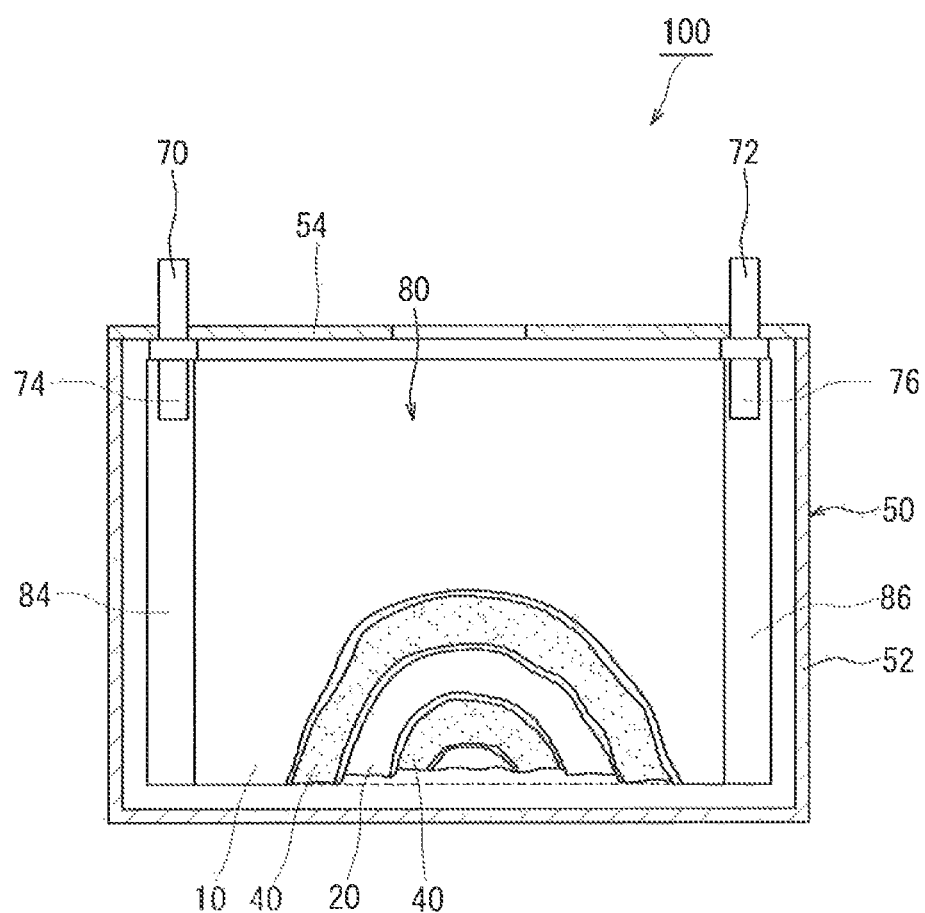
FIG. 4 is a diagram showing a schematic representation of a lithium secondary battery according to one embodiment of the present invention.

With reference to the schematic diagrams shown in FIG. 4 and FIG. 5, an explanation will now be given of one embodiment of a lithium secondary battery constituted using the positive electrode (positive electrode sheet) 10 according to the first embodiment.

As shown in the diagrams, a lithium secondary battery 100 according to the present embodiment has a constitution whereby an electrode body (a wound electrode assembly) 80, which is obtained by winding an elongated positive electrode sheet 10 and an elongated negative electrode sheet 20 into a flat shape via a separator 40, is housed in a box-shaped container 50 having a shape able to house the wound electrode assembly in addition to a non-aqueous electrolyte liquid (not shown).

The container 50 is provided with a bottomed container main body 52, the top of which is open, and a lid 54, which seals this open part. The material that constitutes the container 50 is preferably a metal material such as aluminum, steel, or Ni-plated SUS (Ni-plated SUS in the present embodiment). Alternatively, it is possible to use a container 50 formed from a resin material such as polyphenylene sulfide (PPS) or a polyimide resin. The upper surface (that is, the lid 54) of the container 50 is provided with a positive electrode terminal 70, which is electrically connected to the positive electrode 10 of the wound electrode assembly 80, and a negative electrode terminal 72, which is electrically connected to the negative electrode 20 of the wound electrode assembly 80. The inner part of the container 50 houses the wound electrode assembly 80 and a non-aqueous electrolyte liquid (not shown).

Figure 5:
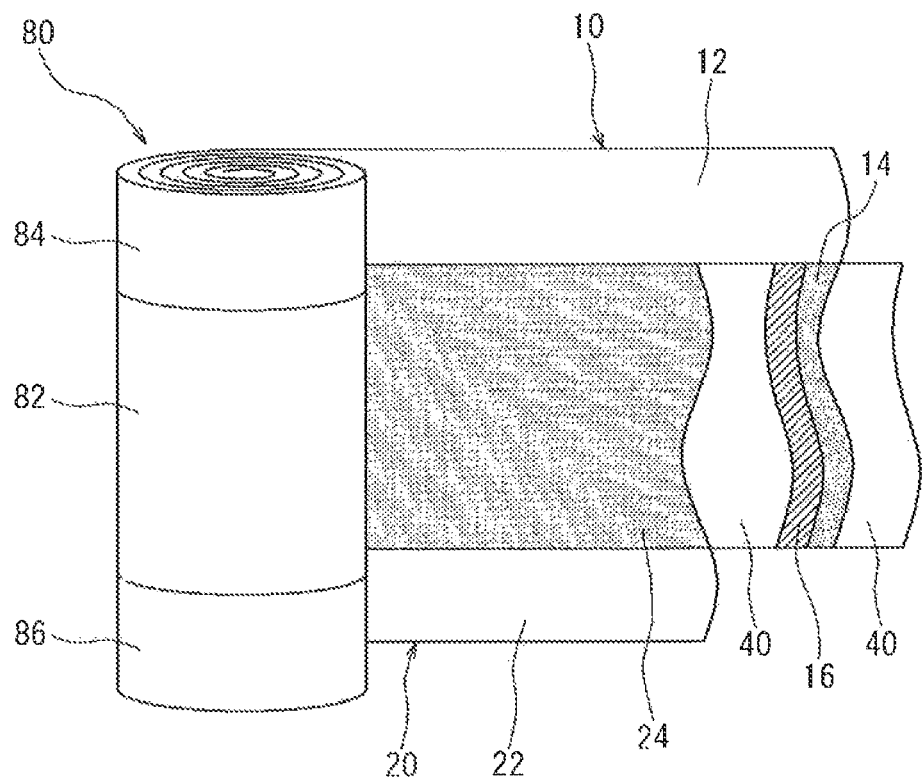
FIG. 5 is a diagram showing a schematic representation of a wound electrode assembly according to one embodiment of the present invention.

The wound electrode assembly 80 according to the present embodiment is the same as a wound electrode assembly of a conventional lithium secondary battery, except for the constitution of the positive electrode sheet 10, and has an elongated (band-shaped) sheet structure in the previous stage in which the wound electrode assembly 80 is assembled, as shown in FIG. 5.

As mentioned above, the positive electrode sheet 10 is provided with the positive electrode current collector 12, the positive electrode active material layer 14, which is formed on the surface of the positive electrode current collector 12, and the electrically conductive film 16, which covers the surface of the positive electrode active material layer. The positive electrode active material layer 14 is not attached to one side edge along an edge, in the width direction, of the positive electrode sheet 10 (the upper edge part in FIG. 5), and a positive electrode active material layer-non-forming part, which exposes a certain width of the positive electrode current collector 12, is formed.

The negative electrode sheet 20 has a structure whereby a negative electrode active material layer 24 that contains a negative electrode active material is held on the surface of an elongated foil-like negative electrode current collector 22. However, the negative electrode active material layer 24 is not attached to one side edge along the edge in the width direction of the negative electrode sheet 20 (the lower edge part in FIG. 5), and a negative electrode active material layer-non-forming part, which exposes a certain width of the negative electrode current collector 22, is formed.

When producing the wound electrode assembly 80, the positive electrode sheet 10 and the negative electrode sheet 20 are laminated via two separator sheets 40. Here, the positive electrode sheet 10 and the negative electrode sheet 20 are overlaid in a staggered manner in the width direction so that the positive electrode active material layer-non-forming part of the positive electrode sheet 10 and the negative electrode active material layer-non-forming part of the negative electrode sheet 20 protrude from the sides of the separator sheet 40 in the width direction thereof. By winding the overlaid laminate in this way, the wound electrode assembly 80 can be produced.

A wound core part 82 (that is, a part in which the positive electrode active material layer 14 of the positive electrode sheet 10, the negative electrode active material layer 24 of the negative electrode sheet 20, and the separator sheet 40 are tightly laminated) is formed in the central part in the winding axis direction of the wound electrode assembly 80. In addition, the electrode active material layer-non-forming parts of the positive electrode sheet 10 and the negative electrode sheet 20 protrude externally from the wound core part 82 at both edges in the winding axis direction of the wound electrode assembly 80. A positive electrode lead terminal 74 and a negative electrode lead terminal 76 are provided at the positive electrode side protruding part (that is, the part in which the positive electrode active material layer 14 is not formed) 84 and the negative electrode side protruding part (that is, the part in which the negative electrode active material layer 24 is not formed) 86 respectively, and are electrically connected to the above-mentioned positive electrode terminal 70 and negative electrode terminal 72 respectively.

Apart from the positive electrode sheet 10, the constituent elements that constitute the wound electrode assembly 80 are not particularly limited, and may be similar to those used in a wound electrode assembly of a conventional lithium secondary battery. For example, the negative electrode sheet 20 may be formed by providing the negative electrode active material layer 24, which mainly comprises a negative electrode active material of a lithium secondary battery, on the elongated negative electrode current collector 22. A copper foil or other metal foil suitable for use in a negative electrode can be advantageously used in the negative electrode current collector 22. The negative electrode active material is not particularly limited, and can be one or two or more types of material previously used in lithium secondary batteries. For example, it is possible to use a carbonaceous material such as graphite carbon or amorphous carbon, a lithium-containing transition metal oxide, a transition metal nitride and the like. A preferred example in the technique disclosed here is a negative electrode active material mainly comprising a carbonaceous material such as graphite carbon or amorphous carbon.

A preferred example of the separator sheet 40 used between the positive electrode sheet 10 and the negative electrode sheet 20 is one constituted from a porous polyolefin-haled resin. For example, a porous separator sheet made from a synthetic resin (for example, a polyolefin such as polyethylene) can be advantageously used.

In addition, with the wound electrode assembly 80 housed in the container main body 52, an electrolyte liquid that contains a suitable electrolyte is disposed (injected) from the upper open part of the container main a body 52 into the container main body 52. The electrolyte is, for example, a lithium salt such as $LiPF_6$. For example, it is possible to use a non-aqueous electrolyte liquid obtained by dissolving an appropriate quantity of a lithium salt such as $LiPF_6$ (for example at a concentration of 1 M) in a mixed solvent of diethyl carbonate and ethylene carbonate (at a mass ratio of for example, 1:1).

The above-mentioned open part is then sealed by, for example, welding to the lid 54, thereby completing the assembly of the lithium secondary battery 100 according to the present embodiment. The container 50 sealing process and the electrolyte disposal (injection) process do not characterize the present invention and may be similar to methods carried out when producing conventional lithium secondary batteries. In this way, the constitution of the lithium secondary battery 100 according to the present embodiment is complete.

The lithium secondary battery 100 constituted in this way is constituted using a positive electrode 10 having good current collection efficiency, as mentioned above, and therefore exhibits excellent battery performance. For example, by constituting a battery using the above-mentioned positive electrode 10, it is possible to provide a lithium secondary battery 100 having excellent high rate charging discharging (input/output) characteristics.

The present invention will now be explained in greater detail through the use of experimental examples, but the present invention is not limited to these experimental examples.

EXPERIMENTAL EXAMPLE 1

Preparation of Positive Electrode Sheet

In Sample 1, the positive electrode sheet 10, in which the electrically conductive film 16 was formed on the surface of the positive electrode active material layer 14, was produced as shown in FIG. 1. Firstly, a $LiNi_{1/3}Co_{1/3}Mn_{1/3}O_2$ powder as a positive electrode active material, acetylene black as an electrically conductive material and polyvinylidene fluoride (PVDF) as a binder were mixed in water at a mass ratio of 91:6:3 so as to prepare a paste for forming a positive electrode active material layer, and this paste was coated on one surface of a positive electrode current collector (an aluminum foil) and then dried so as to form the positive electrode active material layer 14 on one surface of the positive electrode current collector 12. The coating quantity of the paste for forming the positive electrode active material layer was adjusted to he approximately 4.8 mg/cm$^2$ (in terms of solid content) after drying.

Next, the porous electrically conductive film 16 was formed on the surface of the obtained positive electrode active material layer 14. In the present example, a tungsten carbide (WC) film having a thickness of 100 nm was formed as the electrically conductive film. The tungsten carbide film was formed by sputtering using the apparatus shown in FIG. 3. The sputtering conditions were as follows: Tungsten carbide was used as the target, the Ar gas flow rate was 11.5 sccm, the gas partial pressure was $2 \times 10^{-5}$ to $4 \times 10^{-5}$ Torr, and the output was 400 W. In addition, the tungsten carbide film was formed on the edge part 14b of the positive electrode active material layer 14 and as well as the surface of the positive electrode active material layer 14, thereby forming the electrical conductor part 18. The positive electrode sheet 10 of Sample 1, in which the electrically conductive film 16 was formed on the surface of the positive electrode active material layer, was obtained in this way.

In addition, in Sample 2, the positive electrode sheet 110, in which the porous insulating film 120 was formed on the surface of the electrically conductive film (the tungsten carbide film) 116, was prepared, as shown in FIG. 2. In the present example, an alumina ($Al_2O_3$) film having a thickness of 50 nm was formed as the insulating film. The alumina film was formed by vacuum deposition using the apparatus shown in FIG. 3. The vacuum deposition conditions were as follows: Alumina was used as the target, the Ar gas flow rate was 11.5 sccm, the gas partial pressure was $2\times10^{-5}$ to $4\times10^{-5}$ Torr, the power was 30 KV, and the emission current was 50 mA. The positive electrode sheet 110, in which the insulating film 120 was formed on the surface of the electrically conductive film 116, was obtained in this way. Moreover, the positive electrode sheet 110 was prepared in the same way as Sample 1, except that the insulating film 120 was formed on the surface of the electrically conductive film 116.

EXPERIMENTAL EXAMPLE 2

Measurement of Resistance Values of Positive Electrode Sheets

Figure 6:
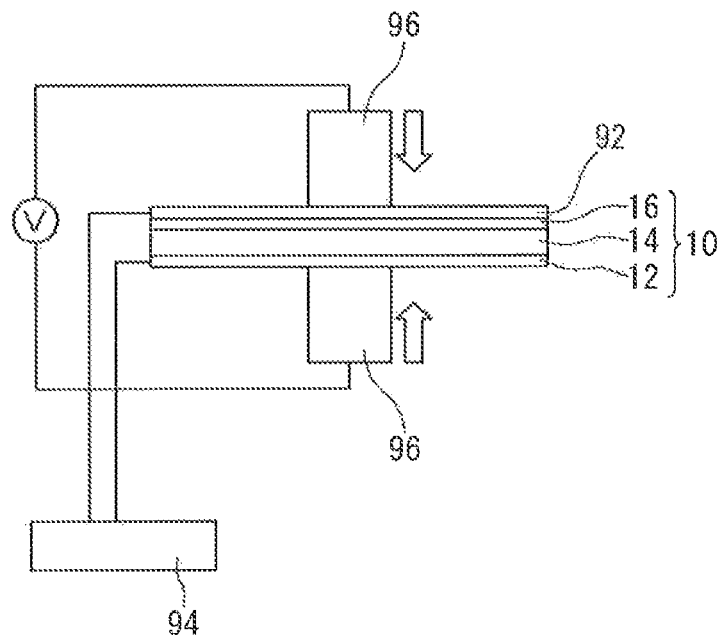
FIG. 6 is a diagram explaining a method for measuring the electrical resistance value according to one experimental example of the present invention.

The electrical resistance values of the positive electrode sheets of Samples 1 and 2 obtained in the above-mentioned Experimental Example 1 were measured. The electrical resistance values were measured using the resistance measurement apparatus shown in FIG. 6. As shown in FIG. 6, an aluminum sheet 92 was placed on the electrically conductive film 16 of the positive electrode sheet 10 according to Sample 1 (or on the insulating film 120 in Sample 2), a load of 1 MPa was applied from above and below by voltage measurement terminals 96, and when a current flowed from a current-applying device 94, the resistance value (penetration resistance) in the vertical direction of the positive electrode sheet was measured from the change in voltage. A larger resistance value in the vertical direction means that the current flowing in the case of a short-circuits between the positive electrode and the negative electrode is lower and the battery performance can be better. The results are shown in the graph in FIG. 7.

Figure 7:
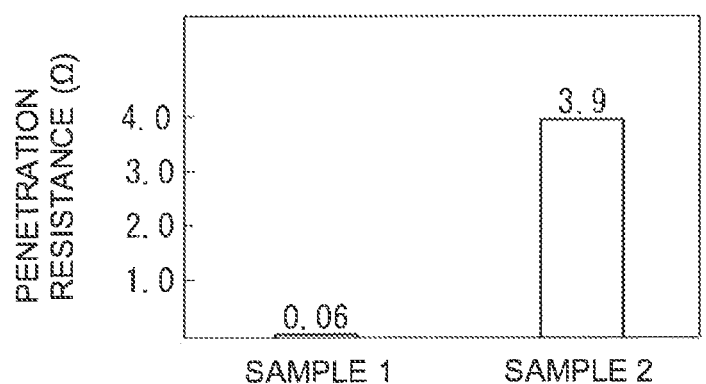
FIG. 7 is a graph showing electrical resistance values of positive electrode sheets according to one experimental example of the present invention.

As is clear from FIG. 7, the positive electrode sheet according to Sample 2, in which the insulating film was formed on the surface of the electrically conductive film, had a higher resistance value in the vertical direction than the positive electrode sheet according to Sample 1, and was therefore shown to have better battery performance.

EXPERIMENTAL EXAMPLE 3

High Rate Charging/Discharging Characteristics Test

A lithium secondary battery (coin battery) was constituted using the positive electrode sheet according to Sample 2 obtained in the above-mentioned Experimental Example 1, and the high rate charging/discharging characteristics of this battery were evaluated. The lithium secondary battery was produced as follows.

Figure 8:
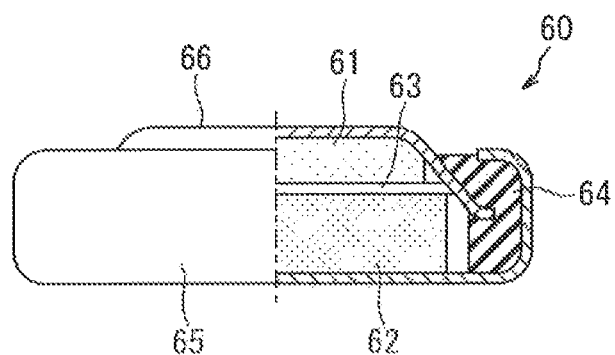
FIG. 8 is a cross-sectional view showing a schematic representation of a test lithium secondary battery (coin battery) according to one experimental example of the present invention.

A positive electrode was prepared by cutting a circle having a diameter of 16 mm from the above-mentioned positive electrode sheet. This positive electrode (working electrode), metallic lithium (a metallic Li foil having a diameter of 19 mm) as a negative electrode (counter electrode), and a separator (a porous polypropylene sheet having a diameter of 22 mm and a thickness of 0.02 mm) were placed in a stainless steel container together with a. non-aqueous electrolyte liquid, thereby constituting the coin battery 60 having a diameter of 20 mm and a thickness of 3.2 mm (2032 type battery) shown in FIG. 8 (a half cell for evaluating charging and discharging performance). In FIG. 8, 61 denotes a positive electrode (working electrode), 62 denotes a negative electrode (counter electrode), 63 denotes a separator containing a non-aqueous electrolyte liquid, 64 denotes a gasket, 65 denotes a container (negative electrode terminal), and 66 denotes a lid (positive electrode terminal). Moreover, the non-aqueous electrolyte liquid was an electrolyte containing $LiPF_6$ as a supporting electrolyte at a concentration of approximately 1 mol/L in a mixed solvent containing ethylene carbonate (EC), dimethyl carbonate (DMC) and ethyl methyl carbonate (EMC) at a volume ratio of 3:4:3. Initial charging and discharging treatment (conditioning) was then carried out using a conventional method so as to obtain a test lithium secondary battery.

In addition, for purposes of comparison, another lithium secondary battery was constituted using a conventional positive electrode sheet, in which an electrically conductive film was not formed on the surface of a positive electrode active material layer. This lithium secondary battery was constituted in the same way as described above, except that a conventional positive electrode sheet was used.

Figure 9:
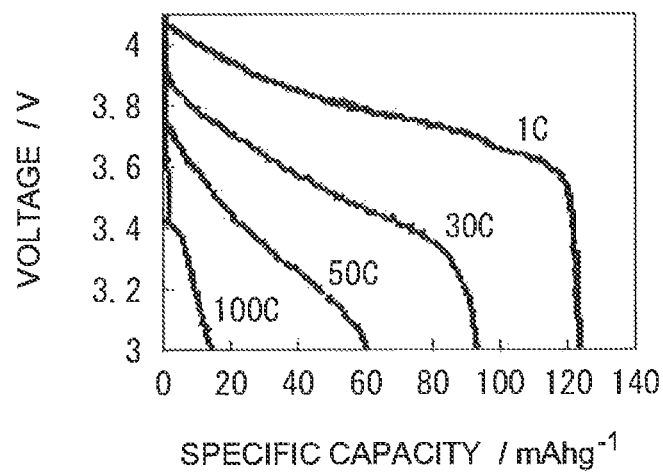
FIG. 9 is a charging/discharging characteristics diagram showing the relationship between voltage and specific capacity according to one experimental example of the present invention.
Figure 10:
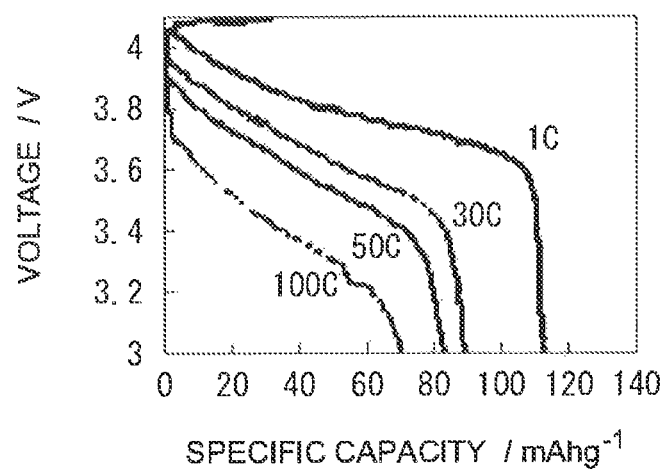
FIG. 10 is a charging/discharging characteristics diagram showing the relationship between voltage and specific capacity according to one experimental example of the present invention.

The obtained test lithium secondary batteries were subjected to high rate charging/discharging tests. Specifically, at 25° C., charging was carried out at a constant current of 1 C, 30 C, 50 C or 100 C until the voltage between the terminals reached 4.1 V. and charging was then carried out at a constant voltage wail the total charging time reached 12 hours. After this CC-CV charging, the battery was discharged at 2.5° C. at a constant current of 1 C, 30 C, 50 C or 100 C until the voltage between the terminals reached 3.0 V, and the battery capacity at this point was measured. The results are shown in FIG. 9 and FIG. 10. FIG. 9 is a characteristic chart showing the relationship between voltage (V) and the specific capacity (mAhg$^{-1}$) of the lithium secondary battery according to the comparative example, and FIG. 10 is a characteristic chart showing the relationship between voltage (V) and the specific capacity (mAhg$^{-1}$) of the lithium secondary battery according to Sample 2.

As shown in FIG. 9, the lithium secondary battery according to the comparative example, which was constituted using a conventional positive electrode sheet, exhibited a dramatic decrease in capacity at a high rate of 50 C or higher. As shown in FIG. 10, by contrast, a lithium secondary battery constituted using a positive electrode sheet in which an electrically conductive film was formed on the surface of a positive electrode active material layer enabled current collection from the surface part of the positive electrode active material layer also, meaning that there was little capacity reduction even at a high rate and it was possible to achieve an extremely high capacity, such as 80 mAh/g or higher at 50 C and 65 mAh/g or higher at 100 C. These results confirmed that by using a positive electrode sheet in which an electrically conductive film is formed on the surface of a positive electrode active material layer, it is possible to constitute a lithium secondary battery having excellent high rate charging/discharging characteristics.

The present invention has been explained above through the use of a preferred embodiment, but the present invention is in no way limited by these matters, and a variety of modifications arc of course possible.

For example, the type of battery is not limited to the above-mentioned lithium ion battery, and it is possible to use batteries having a variety of capacities and containing different electrode-constituting materials and electrolytes, for example a lithium secondary battery having metallic lithium or a lithium alloy as a negative electrode, a nickel metal hydride battery or a nickel cadmium battery. In addition, the constitution of the electrode disclosed here is not limited to the positive electrode 10, and can be used to constitute the negative electrode 20 also. In addition, in the above-mentioned embodiment, a case in which an electrical conductor part 18 for forming a direct electrical connection between the electrically conductive film 16 and the electrode current collector 12 by going around the electrode active material layer 14 is a thin film that covers the side surface 14b of the electrode active material layer 14 is given as an example, but the electrical conductor part 18 is not limited to this example. The electrical conductor part should make an electrical connection between the electrically conductive film and the electrode current collector by means of a separate member that is different from the electrode active material layer. For example, it is possible to form through holes that penetrate from the front surface to the back surface of the electrode active material layer (through holes that expose a part of the surface of the electrode current collector from the electrode active material layer), and form an electrical conductor part (typically a contact hole) by filling the through hole with an electrically conductive material. In such a case also, it is possible to make an electrical connection between the electrically conductive film and the electrode current collector by going around the electrode active material layer (that is, not via an electrically conductive path in the electrically conductive material in the electrode active material layer).

INDUSTRIAL APPLICABILITY

According to the present invention, it is possible to provide a secondary battery (for example, a lithium secondary battery) having excellent high rate charging/discharging characteristics.

Figure 11:
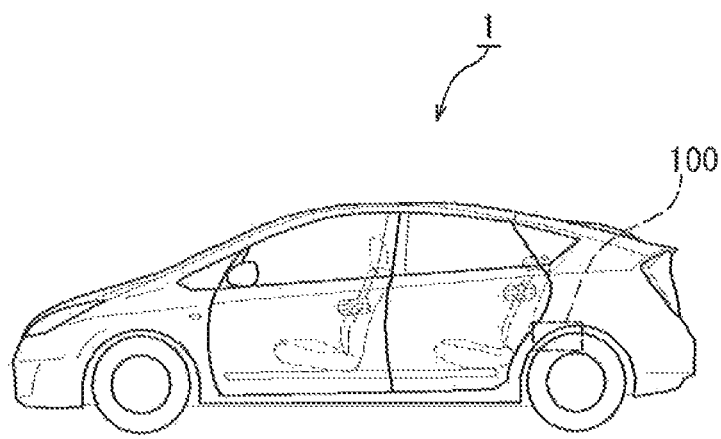
FIG. 11 is a side view showing a schematic representation of a vehicle mounted with a lithium secondary battery according to one embodiment of the present invention.

Moreover, any of the secondary batteries disclosed here exhibits performance suitable for a vehicle-mounted battery (for example, being able to achieve high capacity at high rate). Therefore, a vehicle 1 provided with any of the secondary batteries 100 disclosed here is provided by the present invention, as shown in FIG. 11. In particular, a vehicle (for example, an automobile) having the secondary battery 100 as a power source (typically, a power source for a hybrid vehicle or electric vehicle) is provided.

In addition, preferred examples of the feature disclosed here include secondary batteries expected to be usable in charging/discharging cycles that include high rate charging/discharging such as 50 A or higher (for example, 50 A to 250 A), and especially 100 A or higher (for example, 100 A to 200 A); and large capacity secondary batteries which have a theoretical capacity of 1 Ah or higher (and especially 3 Ah or higher) and which are expected to he used in charging/discharging cycles that include high rate charging/discharging, such as 10 C or higher (for example, 10 C to 100 C), 20 C or higher (for example, 20 C to 100 C), or 50 C or higher (for example, 50 C to 100 C).

The invention claimed is:

1. A secondary battery, comprising an electrode having:
an electrode current collector;
an electrode active material layer formed on a surface of the electrode current collector;
an electrically conductive film that covers a surface of the electrode active material layer;
an electrical conductor part for forming a direct electrical connection between the electrically conductive film and the electrode current collector by going around the electrode active material, layer; and
an insulating film that covers a surface of the electrically conductive film,
wherein the insulating film is constituted from at least one of a metal oxide, a metal nitride and a carbonaceous material that have insulating properties, and
wherein the insulating film contains diamond-like carbon.

2. A method for producing an electrode used in a secondary battery, the secondary battery comprising an electrode having
an electrode current collector;
an electrode active material layer formed on a surface of the electrode current collector;
an electrically conductive film that covers a surface of the electrode active material layer;
an electrical conductor part for forming a direct electrical connection between the electrically conductive film and the electrode current collector by going around the electrode active material layer; and
an insulating film that covers a surface of the electrically conductive film,
the method comprising:
disposing, in a chamber, an electrode structure which is obtained by forming an electrode active material layer on a surface of an electrode current collector;
reducing the pressure inside the chamber, and forming an electrically conductive film on a surface of the electrode active material layer of the electrode structure disposed in the reduced pressure atmosphere; and
forming an insulating film on a surface of the formed electrically conductive film,
wherein the electrode structure is an elongated electrode structure sheet, and the formation of the electrically conductive film and the formation of the insulating film are carried out continuously in a longitudinal direction of the elongated electrode structure sheet.

3. The secondary battery according to claim 1, wherein the electrically conductive film is a porous film that contains pores.

4. The secondary battery according to claim 1, wherein a thickness of the electrically conductive film is 100 nm to 3000 nm.

5. The secondary battery according to claim 1, wherein the electrically conductive film is constituted from at least one of a metal carbide, a metal nitride and a valve metal that are electrically conductive.

6. The secondary battery according to claim 1, wherein the electrically conductive film contains a carbide of at least one metal selected from the group consisting of W, Zr, Ti, Nb, Ta, Cr and Mo.

7. The secondary battery according to claim 1, wherein the electrically conductive film contains a nitride of at least one metal selected from the group consisting of Ti, Zr and Nb.

8. The secondary battery according to claim 1, wherein the electrically conductive film contains at least one valve metal selected from the group consisting of Hf, Al and Zr.

9. The secondary battery according to claim 1, wherein the electrical conductor part is constituted from the same material as the electrically conductive film and is integrally formed with the electrically conductive film.

10. The secondary battery according to claim 1, wherein the electrical conductor part is formed so as to cover an end part of the electrode active material layer and be in contact with the surface of the electrode current collector.

11. The secondary battery according to claim 1, wherein the insulating film is a porous film that contains pores.

12. The secondary battery according to claim 1, wherein a thickness of the insulating film is 10 nm to 100 nm.

13. The production method according to claim 2, wherein the formation of the electrically conductive film and the formation of the insulating film are carried out in the same chamber in which the reduced pressure atmosphere is formed.

* * * * *